(12) United States Patent
Frank

(10) Patent No.: US 7,398,060 B2
(45) Date of Patent: *Jul. 8, 2008

(54) METHOD FACILITATING INTER-MODE HANDOFF

(75) Inventor: Michael Louis Frank, Los Gatos, CA (US)

(73) Assignee: Avago Technologies Wireless IP Pte Ltd (SG)

( * ) Notice: Subject to any disclaimer, the term of this patent is extended or adjusted under 35 U.S.C. 154(b) by 27 days.

This patent is subject to a terminal disclaimer.

(21) Appl. No.: 10/938,222

(22) Filed: Sep. 9, 2004

(65) Prior Publication Data
US 2005/0032548 A1 Feb. 10, 2005

Related U.S. Application Data

(62) Division of application No. 10/396,662, filed on Mar. 24, 2003, now Pat. No. 6,845,231.

(51) Int. Cl.
H04B 1/44 (2006.01)
H04B 7/00 (2006.01)

(52) U.S. Cl. ........................... 455/83; 455/552.1

(58) Field of Classification Search .................. 455/88, 455/73, 78, 83, 39, 552.1, 553.1; 343/702, 343/700 MS
See application file for complete search history.

(56) References Cited

U.S. PATENT DOCUMENTS

| 5,638,034 | A | * | 6/1997 | Heikkila et al. ............ 333/17.1 |
|---|---|---|---|---|
| 5,768,691 | A | | 6/1998 | Matero et al. |
| 6,107,898 | A | * | 8/2000 | Rauscher ..................... 333/175 |
| 6,249,687 | B1 | * | 6/2001 | Thomsen et al. ......... 455/553.1 |
| 6,584,304 | B1 | * | 6/2003 | Thomsen et al. ......... 455/188.1 |
| 6,721,544 | B1 | | 4/2004 | Franca-Neto |
| 6,735,426 | B1 | * | 5/2004 | Pau ........................... 455/255 |
| 6,845,231 | B2 | * | 1/2005 | Frank .......................... 455/88 |
| 6,865,376 | B2 | * | 3/2005 | Forrester ..................... 455/73 |
| 2002/0090974 | A1 | | 7/2002 | Hagn |
| 2002/0101907 | A1 | | 8/2002 | Dent et al. |
| 2003/0068998 | A1 | | 4/2003 | Yamakawa et al. |

FOREIGN PATENT DOCUMENTS

| DE | 10136337 | 2/2002 |
|---|---|---|
| DE | 10053205 | 5/2002 |
| DE | 10054968 | 5/2002 |
| GB | 2346049 | 7/2000 |

* cited by examiner

Primary Examiner—Douglas W. Owens
Assistant Examiner—Minh Dieu A

(57) ABSTRACT

A cellular handset supports non compressed handover for different frequency ranges, and different wireless standards.

3 Claims, 11 Drawing Sheets

METHOD FACILITATING INTER-MODE HANDOFF

CROSS-REFERENCE TO RELATED APPLICATIONS

The present application is a divisional application 10/396662 filed Mar. 3, 2003 under 37 C.F.R. § 1.53(b) and claims priority under 35 U.S.C. § 120 from U.S. Pat. No. 6,845,231, the disclosure of which is specifically incorporated herein by reference.

BACKGROUND

Cellular phones (handsets) are increasing in complexity as handsets incorporate more types of service. In most of the world, the trend is for a handset to work with both Code Division Multiple Access (CDMA) type signals as well as the older Frequency Modulation (fm) type signals. These different modulation schemes both coexist in the same signal band and exist in different bands. The handset may have to transition from one to the other.

There are four major GSM standards as shown in Table 1. The low band contains two standards: GSM 850 and GSM 900. The high band also contains two standards: GSM 1800 and GSM 1900. GSM 850 operates in the United States, in the cellular band. GSM 900 operates in Europe. GSM 1800, also known as DCS, also operates in Europe. GSM 1900 operates in the United States in the PCS band. The modulation scheme WCDMA operates in most of the world (with the US the major exception), in the UMTS band.

TABLE 1

| Standard | Transmit | Receive |
| --- | --- | --- |
| GSM 850 | 824 to 849 MHz | 869 to 894 MHz |
| GSM 900 | 890 to 915 MHz | 935 to 960 MHz |
| GSM 1800 | 1710 to 1785 MHz | 1805 to 1880 MHz |
| GSM 1900 | 1850 to 1910 MHz | 1930 to 1990 MHz |
| UMTS | 1920 to 1980 MHz | 2110 to 2170 MHz |

Global System for Mobile Communications (GSM) type phones are becoming the defacto global standard. Consequently, handsets that enable the GSM scheme must also support other schemes. To illustrate, $3^{rd}$ Generation (3G) handsets must support both GSM and WCDMA. Both modes operate simultaneously, communicating in one mode and searching for service in another. Prior art architecture requires timing to avoid self-interference. This timing technique is called "Compressed Mode" (CM). In CM, the UMTS transmitter is temporarily switched into a state of twice the data rate, and thus twice the power. This allows for a following state where this transmitter is not broadcasting. The handset is then set to receive either GSM band, in order to establish a reliable link to a GSM basestation. This allows the handset to hand-over into the GSM network in a reliable manner. There is a price to be paid for this mode, however. First, this requires that the handset double it's output power. This is not possible if the handset is at the far end of it's range. Indeed, the most likely time for such a hand-over is just such a circumstance. Second, this increase in power results in a variable power at the basestation, impacting the network's power control. Loss of power control impacts the network capacity.

FIG. 1 shows a prior art Quad Band Dual Mode (QBDM) handset which requires compressed mode handover. Current 3G front-end circuits consist of two main components: the switch and the filters. The switch toggles between transmission (Tx) and reception (Rx) in either GSM mode or to the duplexer for the WCDMA in the UMTS band. The antenna switch determines which path is connected to the antenna. For GSM, either the transmitter or the receiver is engaged. For WCDMA, both Tx and Rx are on concurrently and must be kept distinct with a duplexer. In most of the world, the handset can operate in three modes: GSM 900, GSM 1800, or WCDMA. In the US, where the UMTS band is not allowed, the handset can operate in either GSM 850 or 1900.

FIG. 2 shows another prior art QBDM handset that supports compressed mode handover. Similar to FIG. 1, the switch toggles between transmission (Tx) and reception (Rx) in either GSM mode or to the duplexer for the WCDMA in the UMTS band. After the antenna receives the signal, the signal path is split into two by the diplexer. Positioned on either side of the diplexer are switches that further determine which path is connected to the antenna. For GSM, either the transmitter or the receiver is engaged. For WCDMA, both Tx and Rx are on concurrently and must be kept distinct with a duplexer. The handset can operate in three modes: GSM 900, GSM 1800, or WCDMA. While supporting non compressed mode in GSM 900, this architecture also supports only CM handover in GSM 1800. Similarly, there is no handover to the US GSM bands.

FIG. 3 shows another prior art QBDM handset with compressed mode handover. This circuit requires careful design as the phase must be right for all of the filters. The handset supports non-compressed mode handover from WCDMA to only GSM 900. Handover to GSM 1800 requires compressed mode. In addition, there are four different states possible, one for each switch state. All present different impedances in the UMTS Rx band. The differing impedances make it difficult to properly tune the receiver, reducing sensitivity in some states, possibly increasing the number of frame errors. The handset itself counts upon the received signal to estimate the distance to the base station. The change in impedance will introduce error into this calculation, impacting the quality of the link.

SUMMARY

In a circuit topology, a handset that supports GSM 900, GSM 1800/, UMTS, and may or may not support GSM 850 or GSM 1900, includes an antenna for transceiving a signal. A diplexer interposes the antenna, a first antenna switch and a second antenna switch. A first transmitter for a first frequency band connects to an output of the first antenna switch. A first receiver for the first frequency band connects to another output of the first antenna switch. A second transmitter for a second frequency band connects to an output of the second antenna switch. A triplexer has an input connected to another output of the second antenna switch. The triplexer has a first output connected to a receiver at the second frequency band, a second output connected to a receiver at the third frequency band, and a third output connected to a transmitter of the third frequency band.

In an alternate circuit topology, the first antenna switch further includes a third output connected to a second receiver for a third frequency band. The second antenna switch further includes a third output connected to a second receiver for a fourth frequency band. Including transmit bands for GSM 850 and GSM 1900 does not require extra switches. The power amplifiers for GSM are wide band, and so the GSM 900 transmitter will also cover the 850 band, the GSM 1800 transmitter will cover the 1900 band.

In another circuit topology, an antenna transceives a signal. An antenna switch, connected to the antenna, has outputs connected to a first transmitter for a first frequency band, a first receiver for the first frequency band, a second receiver for a second frequency band, a second transmitter for the second frequency band, and a quadplexer. The quadplexer has outputs connected to a receiver in the first frequency band, a receiver in the second frequency band, a receiver in the third frequency band, and a transmitter of the third frequency band.

This topology can be generalized to an n-plexer, or an arbitrary number of filters connected to discriminate between an arbitrary number of frequencies. This is limited in practice by the bands that an antenna can cover, and the separation of the frequencies. Typical handset antennae cover all the bands discussed above, as well as perhaps GPS (Global Positioning Satellite) at 1575 MHz. Thus, one could discriminate between two GSM receive bands, both transmit and receive frequency bands of UMTS, and the GPS band, for a 5-plexer.

DETAILED DESCRIPTION

A cellular handset supports simultaneous service for different frequency ranges and different wireless standards.

Figure 1:
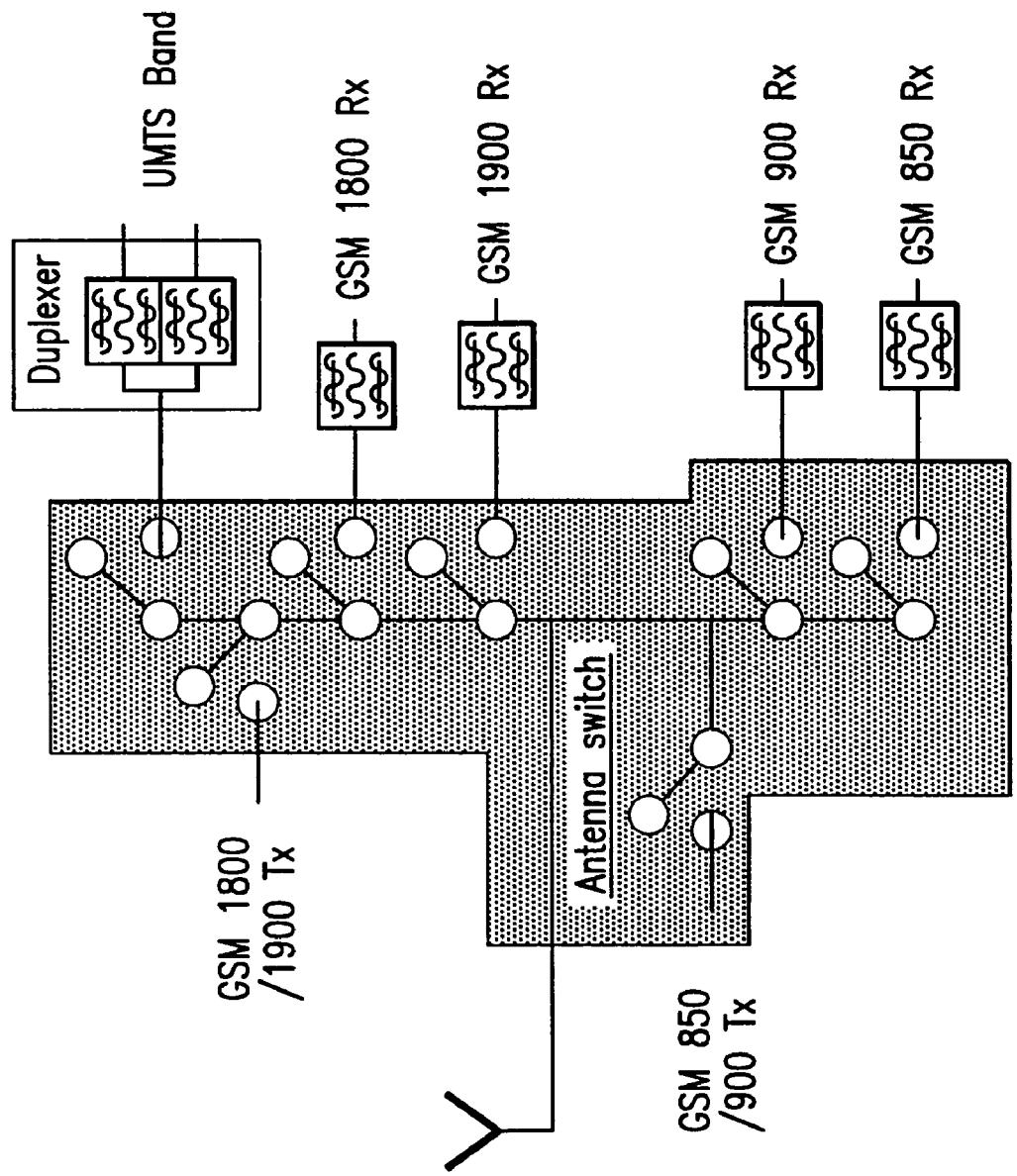
FIG. 1 illustrates a circuit topology for a prior art handset.
Figure 2:
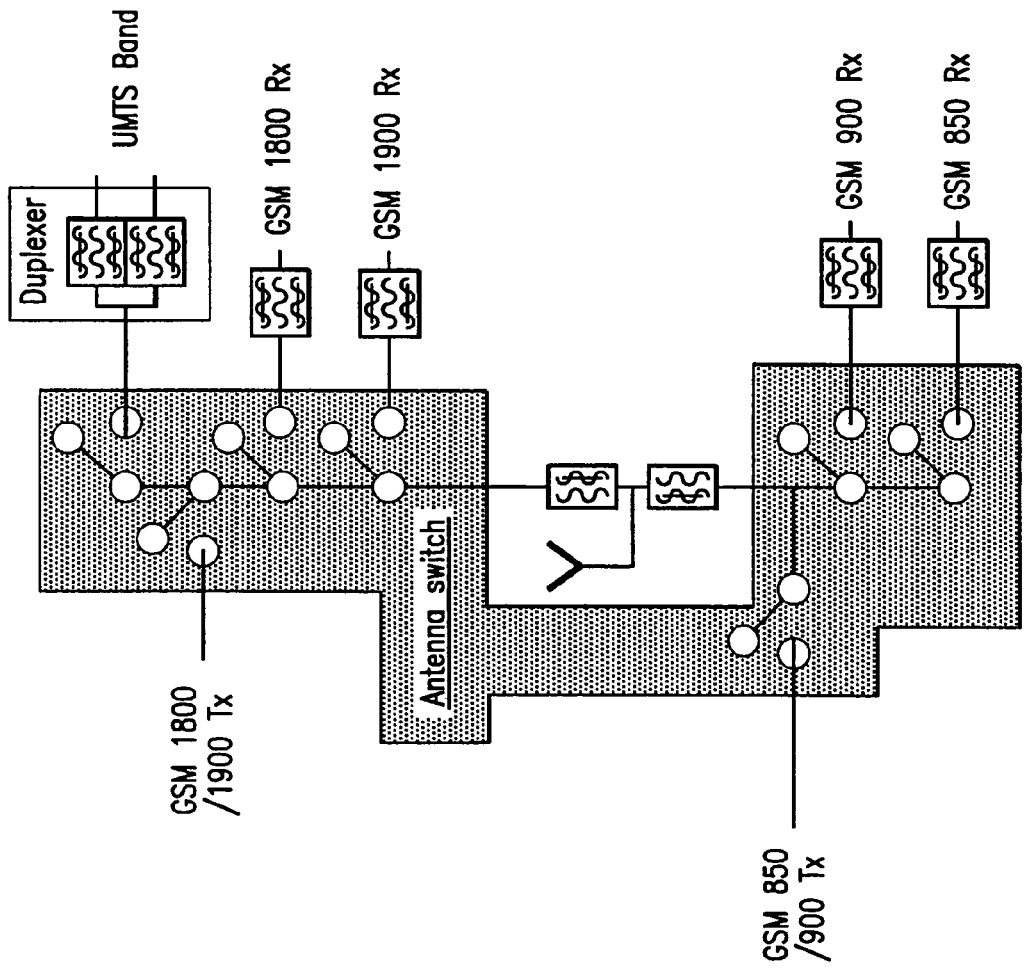
FIG. 2 illustrates a circuit topology for a prior art handset.
Figure 3:
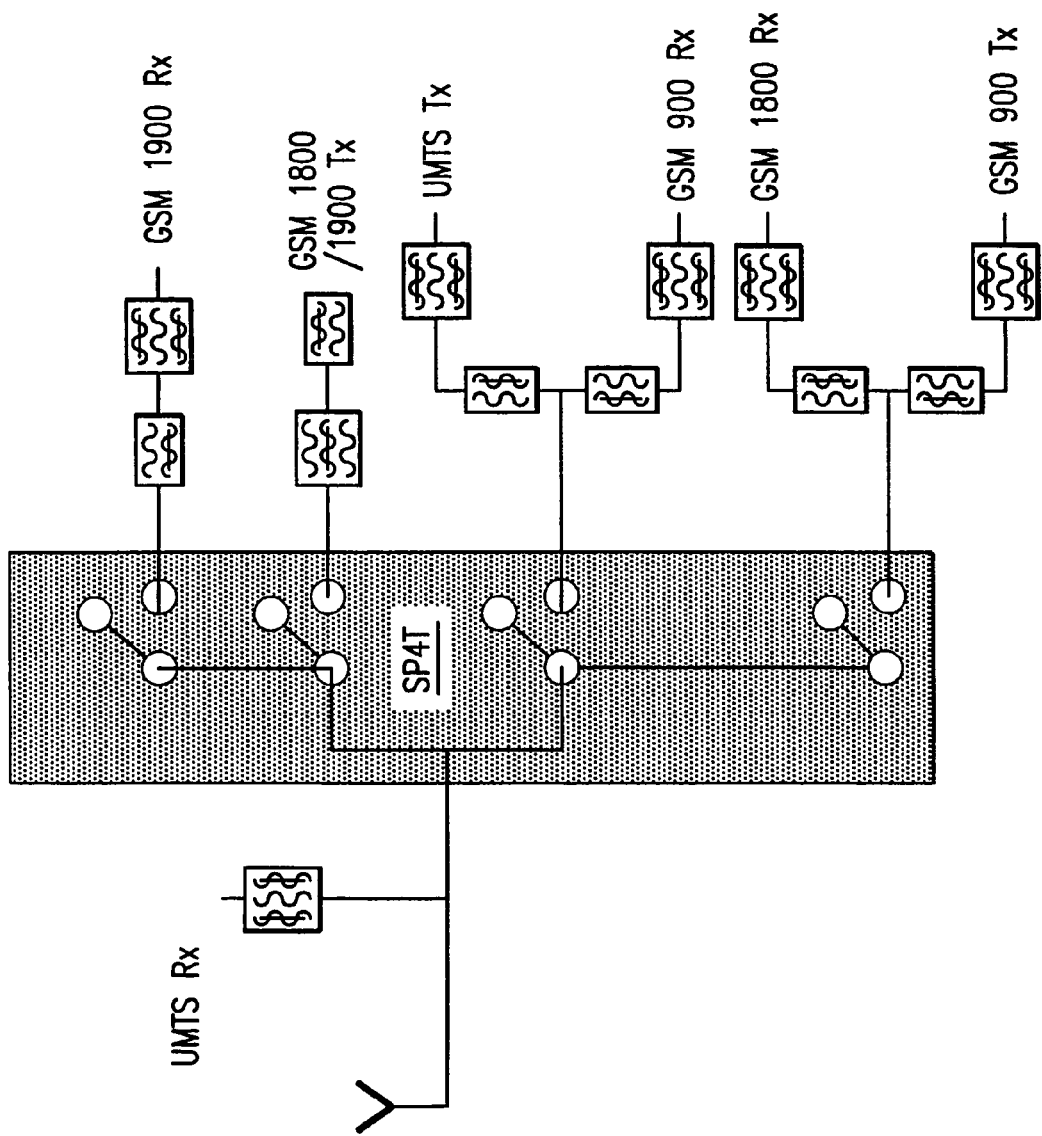
FIG. 3 illustrates a circuit topology for a prior art handset.
Figure 4:
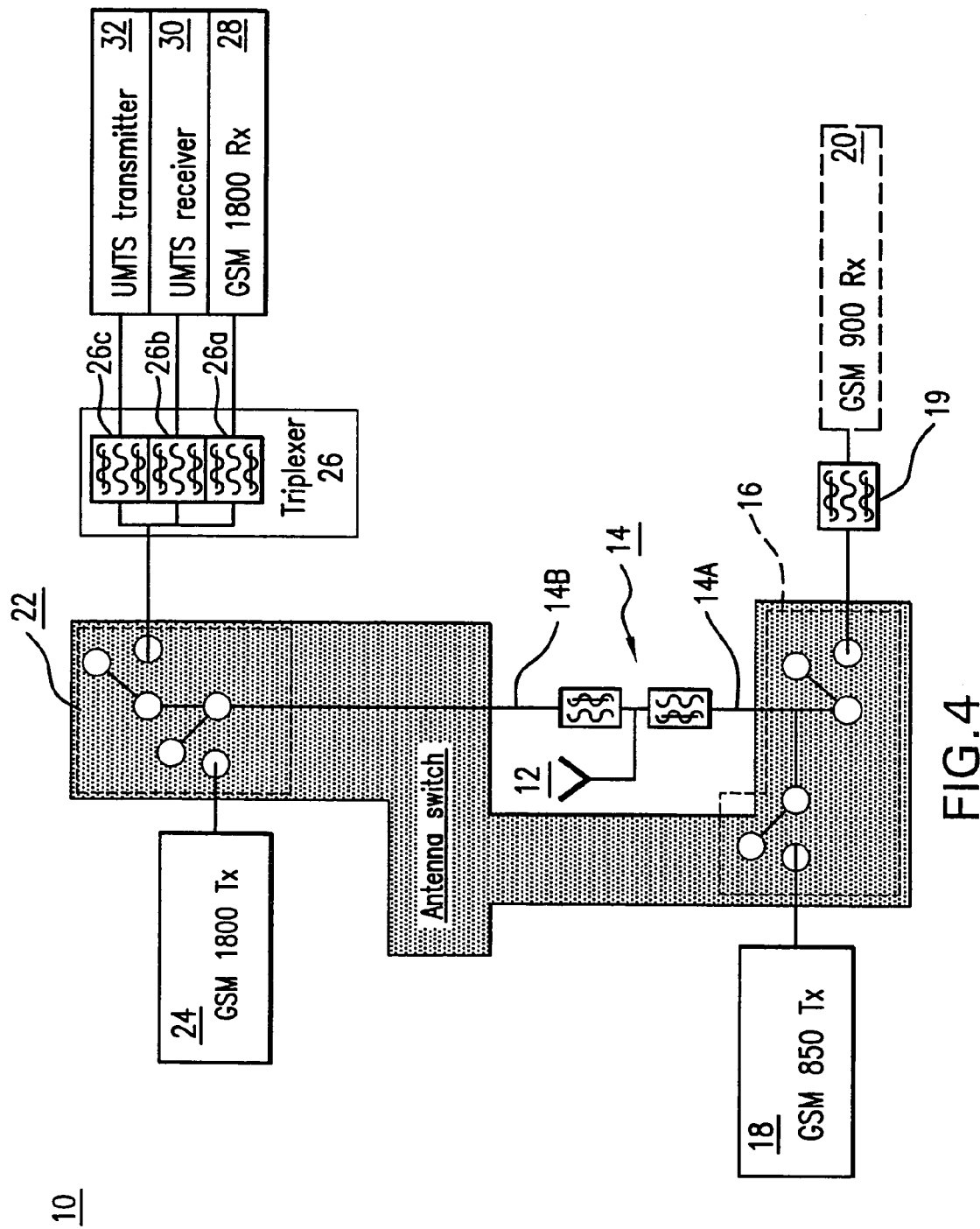
FIG. 4 illustrates a circuit topology according to the present invention.

FIG. 4 illustrates an embodiment (10) of the present invention. An antenna (12) is connected to a diplexer (14) having a first and a second output (14A, 14B). The first diplexer output (14A) connects to a first single pole two-throw switch (SP2T) (16). The first SP2T (16) is connected to a GSM 850 transmitter (18) and an optional bandpass filter for GSM 900 receiver (19). The bandpass filter for GSM900 receive (19) is further connected to a GSM900 receiver (20). The second diplexer output (14B) connects to a second SP2T (22). The second SP2T (22) connects to a GSM 1800 transmitter (24) and a triplexer (26). The triplexer (26) has a first output (26a) connected to a GSM 1800 receiver (28), a second output (26B) connected to UMTS band receiver (30), and a third output (26C) connected to a UMTS band transmitter (32).

In operation, this circuit topology supports non compressed mode hand-over from UMTS to either GSM 1800 or GSM 900.

Figure 5:
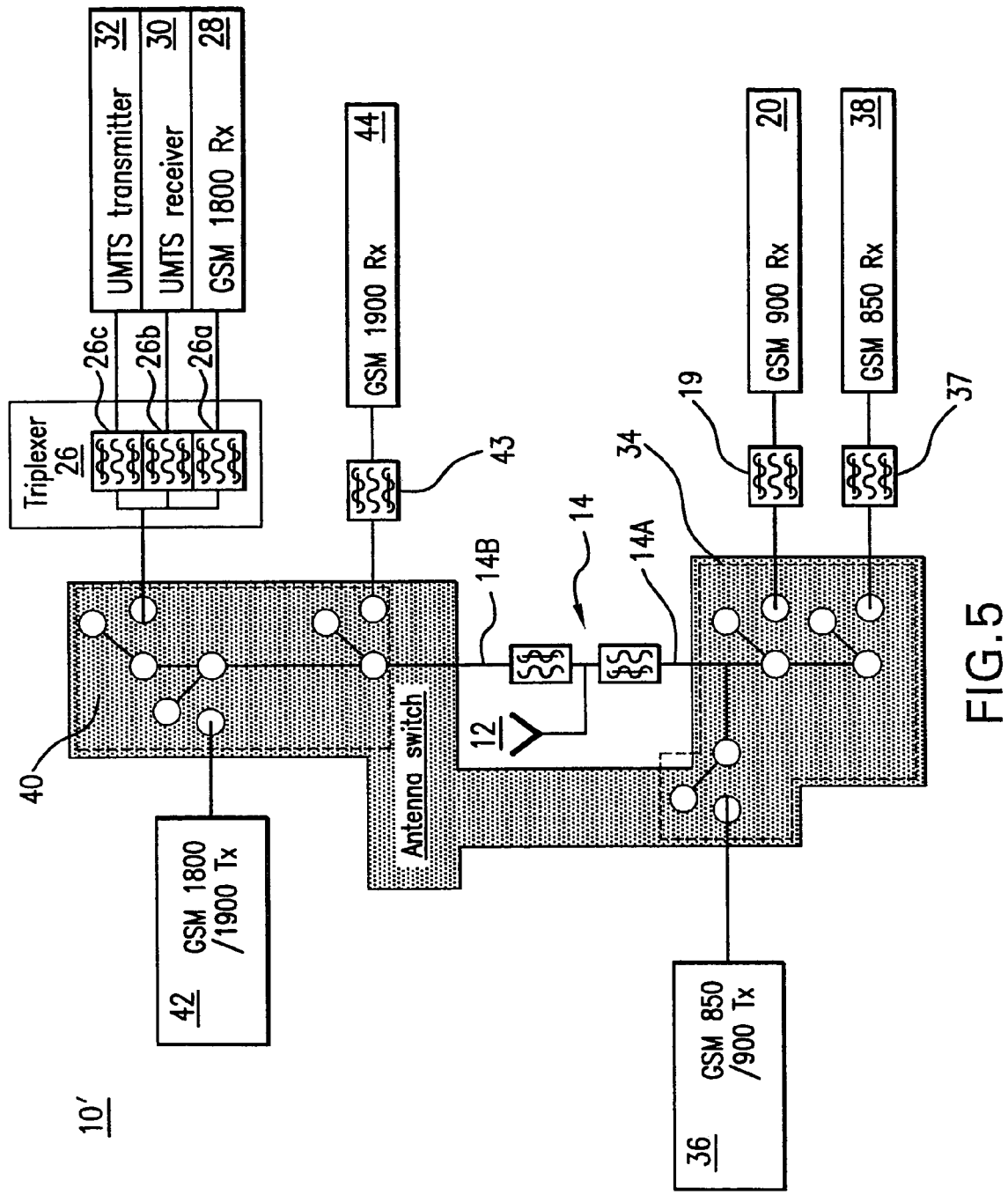
FIG. 5 illustrates an alternate circuit topology according to the present invention.

FIG. 5 illustrates another embodiment (10') of the present invention. An antenna (12) is connected to a diplexer (14) having a first and a second output (14A, 14B). The first diplexer output (14A) connects to a first single pole three-throw switch (SP3T) (34). The first SP3T (34) is connected to a GSM 850/900 transmitter (36), an optional bandpass filter for GSM 900 receive (19), and an optional bandpass filter for GSM 850 (37). The bandpass filter for GSM 900 receive (19) is further connected to a GSM 900 receiver (20). The bandpass filter for GSM 850 receive (37) is further connected to a GSM 850 receiver (38). The second diplexer output (14B) connects to a second SP3T (40). The second SP3T (40) connects to a GSM 1800/1900 transmitter (42), a triplexer (26), and a bandpass filter for GSM 1900 receive (43). The bandpass filter for GSM 1900 receive (43) further connects to a GSM 1900 receiver (44). The triplexer (26) has a first output (26A) connected to a GSM 1800 receiver (28), a second output (26B) connected to UMTS band receiver (30), and a third output (26C) connected to a UMTS band transmitter (32).

In operation, this circuit topology supports non compressed mode-hand-over from UMTS to either GSM 1800 or GSM 900.

Figure 6:
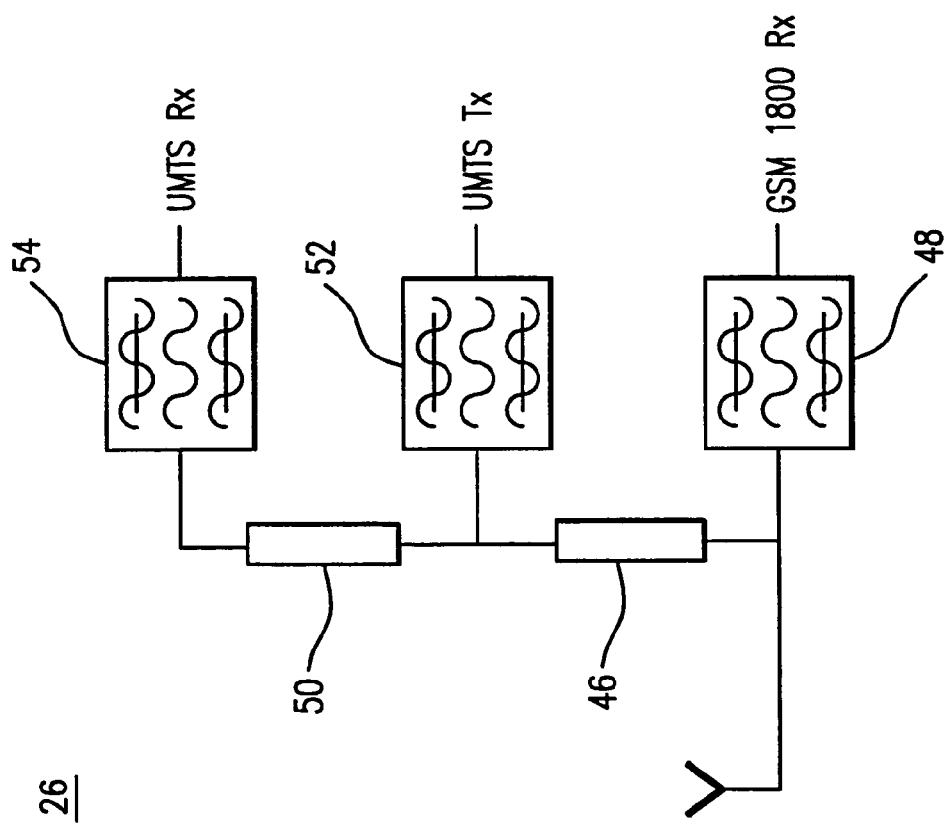
FIG. 6 illustrates a triplexer according to the present invention.
Figure 7:
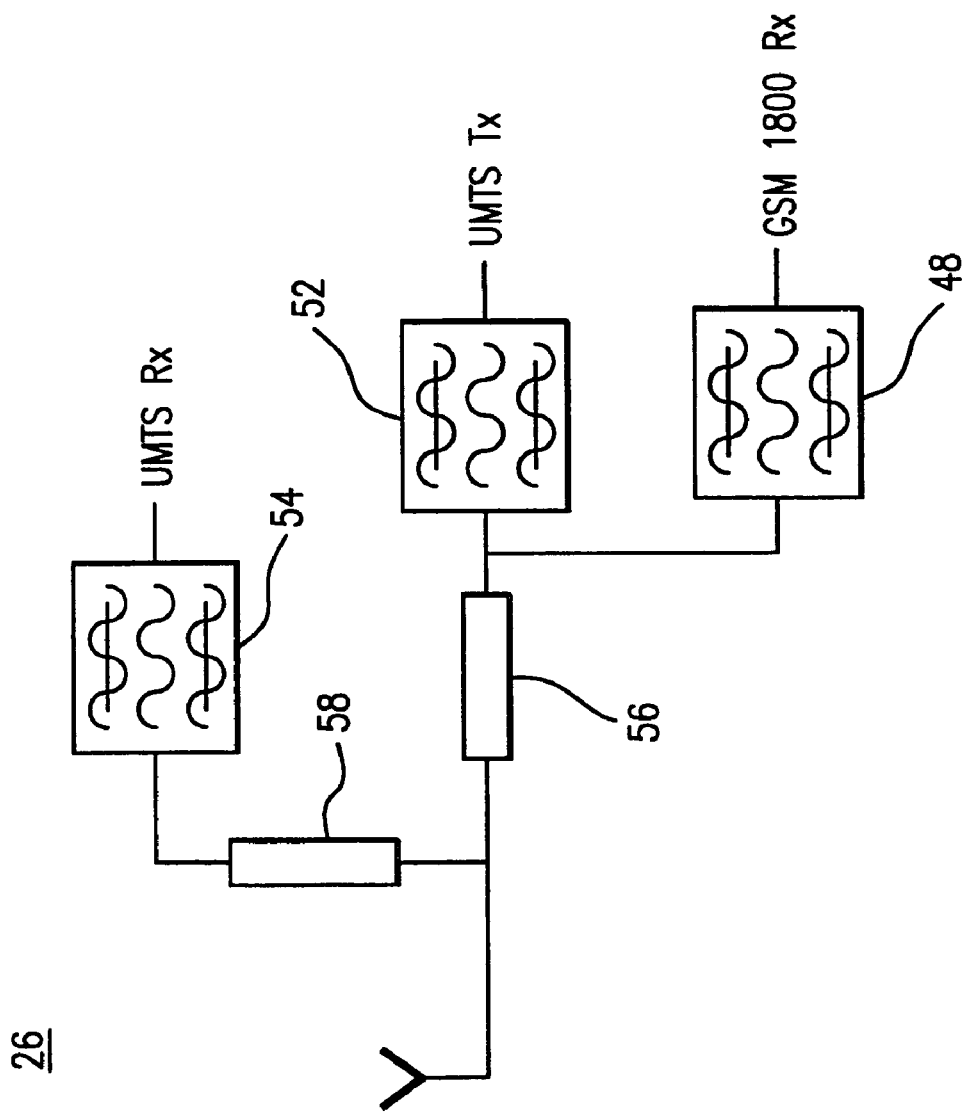
FIG. 7 illustrates an alternate triplexer according to the present invention.
Figure 10:
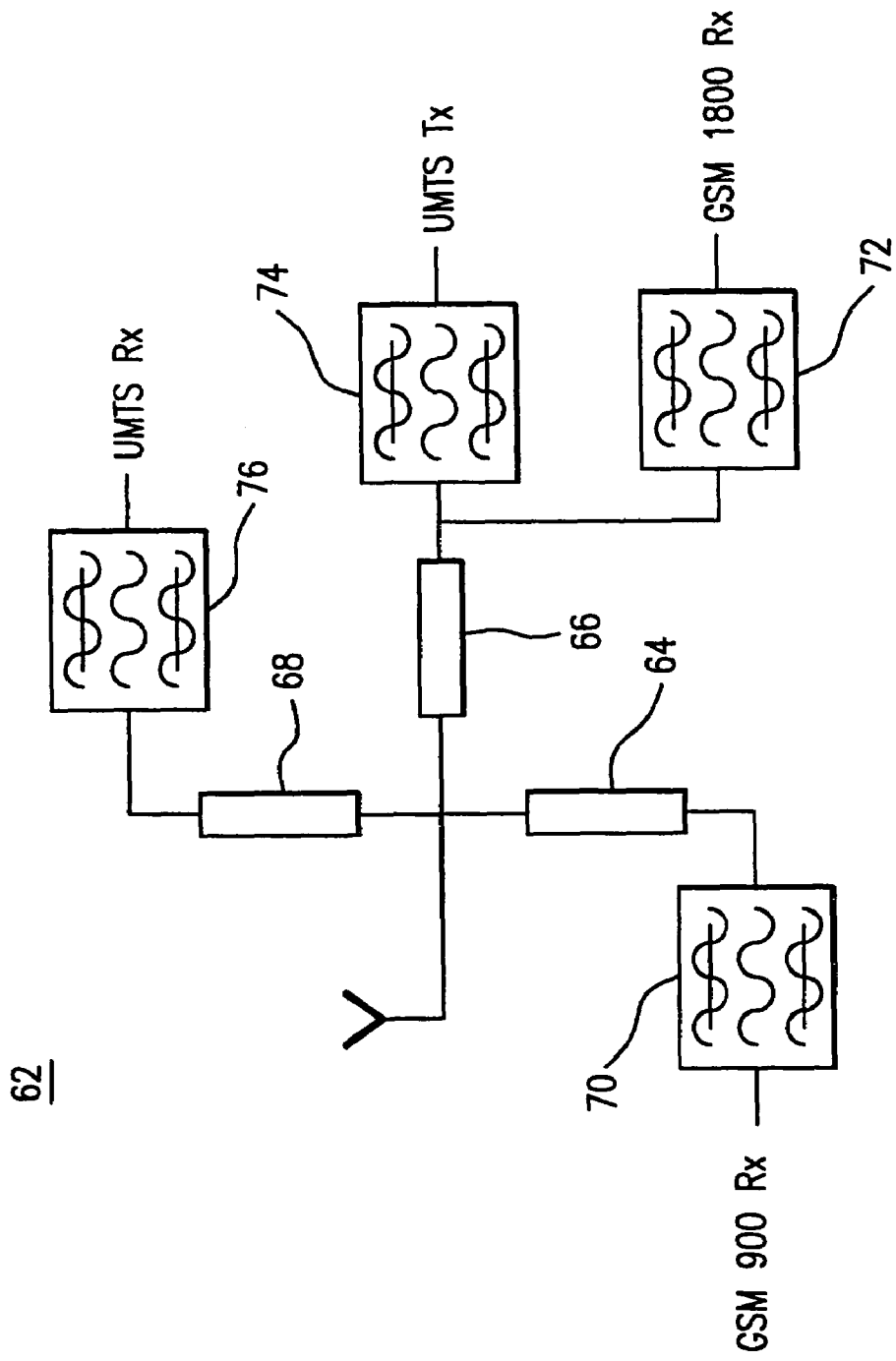
FIG. 10 illustrates a quadplexer of the present invention.

FIGS. 6, 7, and 10 illustrate embodiments of an n-plexer according to the invention. Each filter has an impedance that varies greatly with frequency. In the pass band, the filter looks like a low loss path, and so the impedance on one port appears on the other, and vice versa. In the reject bands, the filter looks like either an open circuit, or a short circuit, depending upon the port, and the filter implementation. To illustrate, in FIG. 7, the UMTS Rx filter presents a short circuit at the UMTS Tx band. This short circuit is rotated by the transmission line between the two UMTS filters such that the short circuit becomes an open circuit, and so does not load the signal at UMTS Tx. The UMTS Tx filter similarly looks like a short circuit at GSM 1800. The transmission line between the UMTS Tx filter and the GSM 1800 filter rotates this short circuit into an open circuit.

FIG. 6 illustrates a triplexer (26) of the present invention. An input is connected to a first transmission line (46) and a first bandpass filter at a first frequency band (48). The first transmission line (46) is further connected to a second transmission line (50) and a second bandpass filter at a second frequency band (52). The second transmission line (50) connects to a third bandpass filter at a third frequency band (54). In a preferred embodiment, the first frequency band is a GSM 1800, the second frequency band is UMTS transmit, and a third frequency band is a UMTS receive, as shown in FIG. 4 and FIG. 5.

FIG. 7 illustrates an alternate triplexer (26) of the present invention. An input is connected to a first and a second transmission line (56, 58). The first transmission line (56) is connected to a first bandpass filter at first frequency band (48) and a second bandpass filter at a second frequency band (52). The second transmission line (58) is connected to a third bandpass filter at a third frequency band (54). In a preferred embodiment, the first frequency band is GSM 1800 receive, the second frequency band is UMTS transmit, and a third frequency band is a UMTS receive.

Figure 8:
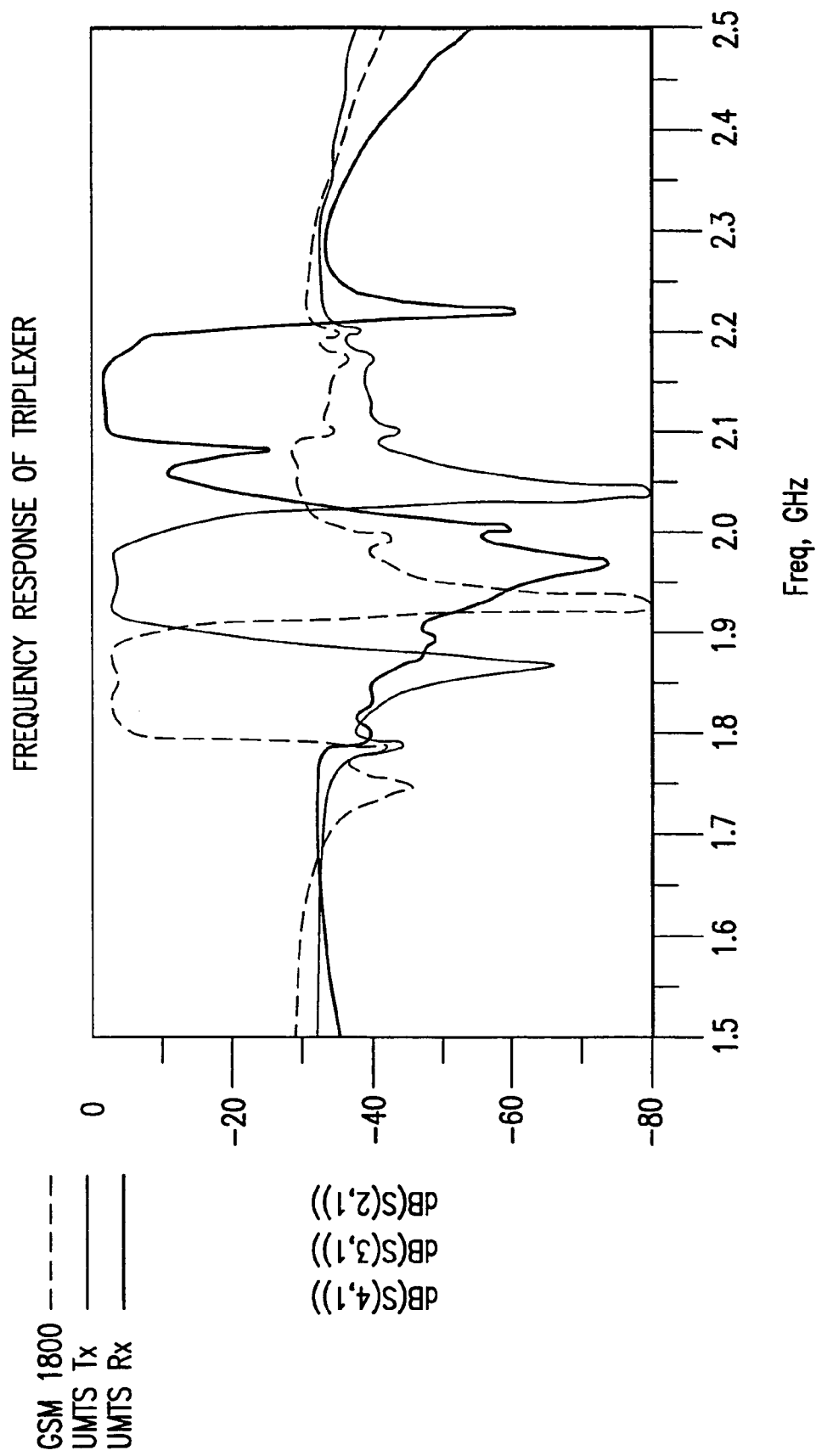
FIG. 8 illustrates the frequency response of the triplexer shown in FIG. 7

FIG. 8 illustrates the frequency response of the triplexer (26, 26').

Figure 9:
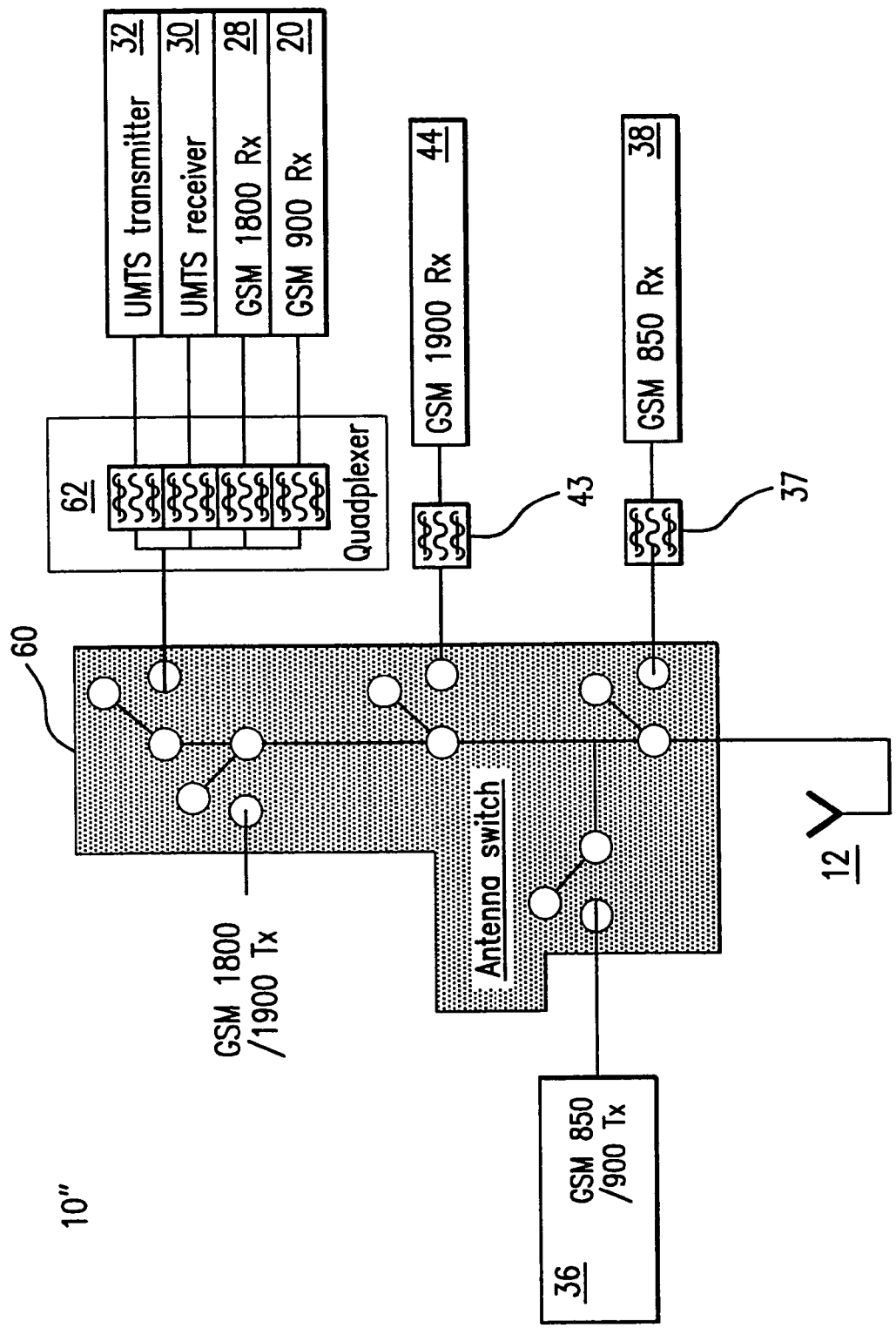
FIG. 9 illustrates an alternate circuit topology of the present invention.

FIG. 9 illustrates an alternate circuit topology (10") of the present invention. An antenna (12) is connected to a single pole five throw switch (SP5T) (60). The SP5T (60) connects to a GSM 850/900 transmitter (36), an optional bandpass filter for GSM 850 receive (37), an optional bandpass filter for GSM 1900 receive (43), a GSM 1800/1900 transmitter (42), and a quadplexer (62). The bandpass filter for GSM 850 receive (37) further connects to a GSM 850 receiver (38). The bandpass filter for GSM 1900 receive (43) further connects to a GSM 1900 receiver (44). The quadplexer (62) connects to a GSM 900 receiver (20), a GSM 1800 receiver (28), a UMTS band receiver (30), and a UMTS band transmitter (32). The circuit supports non-compressed mode hand-over from UMTS to either GSM 1800 or GSM 900.

FIG. 10 illustrates a quadplexer (62) of the present invention. Three transmission lines (64, 66, 68) are connected at the input. A first bandpass filter at a first frequency band (70) connects to the output of the first transmission line (64). A second bandpass filter at a second frequency band (72) connects to the output of the second transmission line (66). A third bandpass filter at a third frequency band (74) connects to the output of the second transmission line (66). A fourth bandpass filter at a fourth frequency band (76) connects to the output of the third transmission line (68). In a preferred embodiment, the first frequency band is GSM 900 receive, the second frequency band is GSM 1800 receive, the third frequency band device is UMTS transmit, and a fourth frequency band is UMTS receive.

Figure 11:
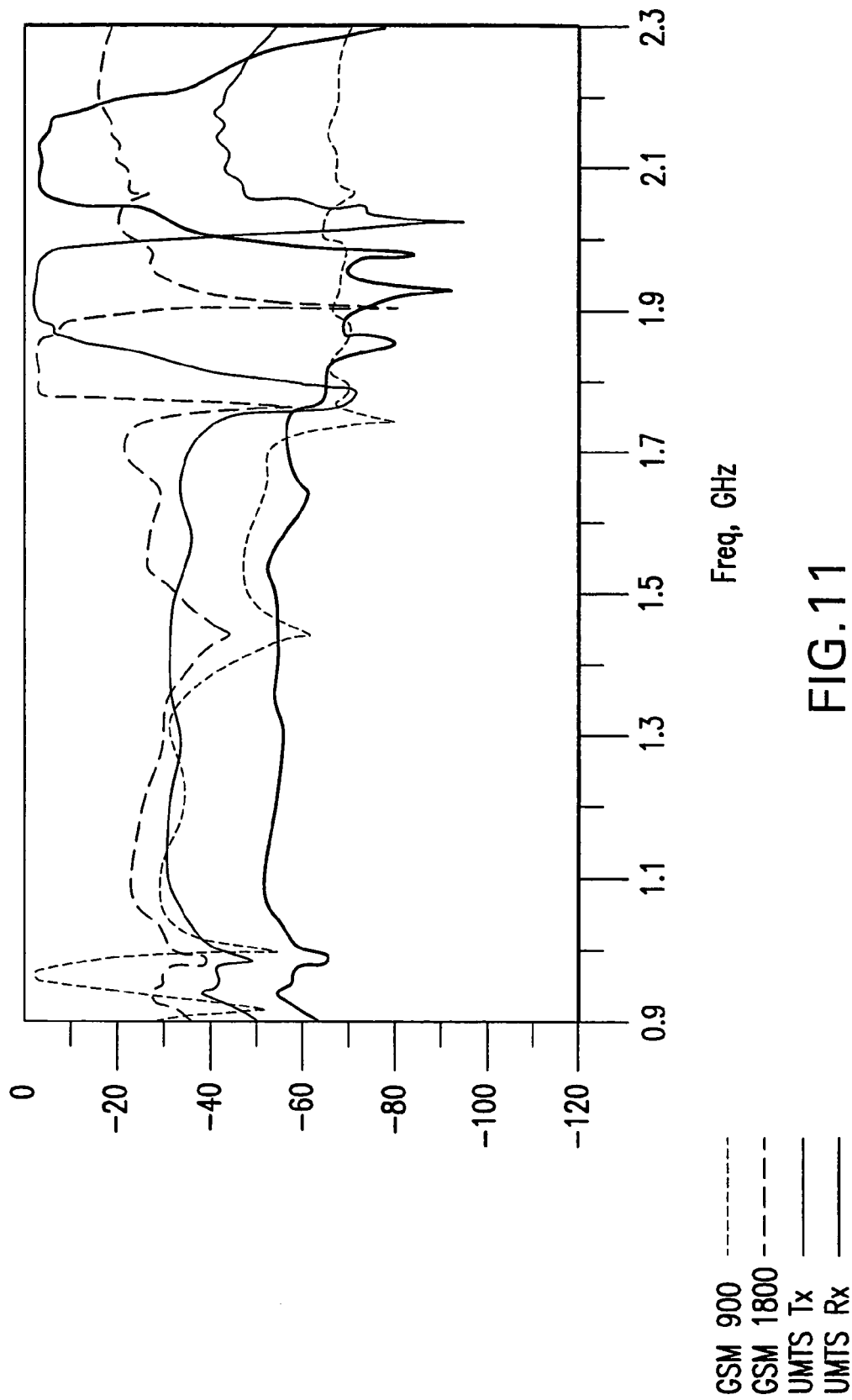
FIG. 11 illustrates a frequency response for the quadplexer shown in FIG. 10.

FIG. 11 illustrates a frequency response for the quadplexer (62) shown in FIG. 10.

I claim:

1. A triplexer including:
   a first transmission line;
   a first and a second bandpass filter connecting to the first transmission line, wherein the first bandpass filter passes a first frequency band and the second bandpass filter passes the second frequency band;
   a second transmission line connecting to the first transmission line; and
   a third bandpass filter connecting to the second transmission line, for passing the second frequency band;
   wherein the second transmission is chosen to appropriately rotate the reject band impedance of the third bandpass filter into an open circuit at the passband of filters one and two.

2. A n-plexer including:
   a first and a second transmission line connected at an input, each having an output;
   a first and a second bandpass filter, each connected to the output of the first transmission line, the first bandpass filter passing a first frequency band, the second bandpass filter passing a second frequency band; and
   a third bandpass filter, connected to the output of the second transmission line, for passing the second frequency band.

3. A n-plexer, as defined in claim 2, further including;
   a third transmission line, connected at the input, having an output;
   a fourth bandpass filter, connected to the output of the third transmission line for passing a third frequency band.

* * * * *